(12) United States Patent
Wu

(10) Patent No.: US 9,086,806 B2
(45) Date of Patent: Jul. 21, 2015

(54) SYSTEM AND METHOD FOR CONTROLLING SAS EXPANDER TO ELECTRONICALLY CONNECT TO A RAID CARD

(75) Inventor: Chih-Huang Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 454 days.

(21) Appl. No.: 13/528,843

(22) Filed: Jun. 21, 2012

(65) Prior Publication Data

US 2013/0159606 A1 Jun. 20, 2013

(30) Foreign Application Priority Data

Dec. 16, 2011 (TW) .............................. 100146965 A

(51) Int. Cl.
*H05K 7/10* (2006.01)
*G06F 3/06* (2006.01)
(52) U.S. Cl.
CPC ............ *G06F 3/0605* (2013.01); *G06F 3/0632* (2013.01); *G06F 3/0689* (2013.01)
(58) Field of Classification Search
CPC ..... G06F 3/0689; G06F 3/0635; G06F 3/067; H04L 67/1097
USPC .................................. 710/301; 711/114, 6.22
See application file for complete search history.

(56) References Cited

U.S. PATENT DOCUMENTS

| | | | | |
|---|---|---|---|---|
| 5,875,415 A * | 2/1999 | Lieb et al. | ..................... | 702/122 |
| 7,356,728 B2 * | 4/2008 | Tawil et al. | .................. | 714/5.11 |
| 7,644,304 B2 * | 1/2010 | Kotzur et al. | ................. | 714/6.11 |
| 8,074,105 B2 * | 12/2011 | Kalwitz et al. | ................ | 714/6.22 |
| 2003/0018805 A1 * | 1/2003 | Meyerson | ...................... | 709/237 |
| 2006/0156055 A1 * | 7/2006 | Cherian et al. | ..................... | 714/4 |
| 2006/0236198 A1 * | 10/2006 | Lintz et al. | ..................... | 714/758 |
| 2007/0083707 A1 * | 4/2007 | Holland et al. | ............... | 711/114 |
| 2007/0168571 A1 * | 7/2007 | Ramsey et al. | ................... | 710/8 |
| 2007/0220204 A1 * | 9/2007 | Nakajima et al. | ............. | 711/114 |
| 2008/0005470 A1 * | 1/2008 | Davies | ......................... | 711/114 |
| 2008/0126696 A1 * | 5/2008 | Holland et al. | ............... | 711/114 |
| 2008/0177946 A1 * | 7/2008 | Cherian et al. | ................ | 711/114 |
| 2008/0189723 A1 * | 8/2008 | Elliott et al. | ................... | 719/326 |
| 2010/0205334 A1 * | 8/2010 | Tominaga | ....................... | 710/65 |
| 2012/0324146 A1 * | 12/2012 | Marks et al. | .................. | 711/103 |

FOREIGN PATENT DOCUMENTS

| | | | | | |
|---|---|---|---|---|---|
| CN | 103164168 A | * | 6/2013 | ............... | G06F 3/06 |
| CN | 203241899 U | * | 10/2013 | ............... | G06F 1/18 |
| CN | 103870367 A | * | 6/2014 | ............. | G06F 11/22 |

* cited by examiner

*Primary Examiner* — Faisal M Zaman
(74) *Attorney, Agent, or Firm* — Novak Druce Connolly Bove + Quigg LLP

(57) ABSTRACT

In a method for controlling a SAS expander to electronically connect to a RAID card in an electronic device, a plurality of different types for RAID cards, and configuration parameters of the SAS expander corresponding to each type of the RAID cards are preset. Information of the RAID card is read if the SAS expander is electronically connected the RAID card. The method further determines whether the RAID card matches the SAS expander. If the RAID card does not match the SAS expander, the configuration parameters of the SAS expander corresponding to the RAID card is read, and the read configuration parameters and the read information of the RAID card are written into a firmware file in the storage system. The method further stores the firmware file into a flash memory of the SAS expander.

15 Claims, 3 Drawing Sheets

SYSTEM AND METHOD FOR CONTROLLING SAS EXPANDER TO ELECTRONICALLY CONNECT TO A RAID CARD

BACKGROUND

1. Technical Field

Embodiments of the present disclosure relate to redundant array of independent disks (RAID) card connection technology, and more particularly to a system and method for controlling serial attached small computer system interface (SAS) expander to electronically connect to a RAID card.

2. Description of Related Art

A RAID card can be connected to a plurality of peripheral devices through a SAS expander. For example, the RAID may be connected to a hard disk drive (HDD) or other SAS expanders through the SAS expander. A firmware of the SAS expander needs to be adjusted according to an attribute or a type of the RAID card. Generally, once the firmware of the SAS expander is built, the RAID card connected to the SAS expander cannot be changed randomly. If the SAS expander is changed to electronically connect to other RAID cards directly, correlative information of the peripheral device connecting to the SAS expander may be confused or lost.

DETAILED DESCRIPTION

Figure 1:
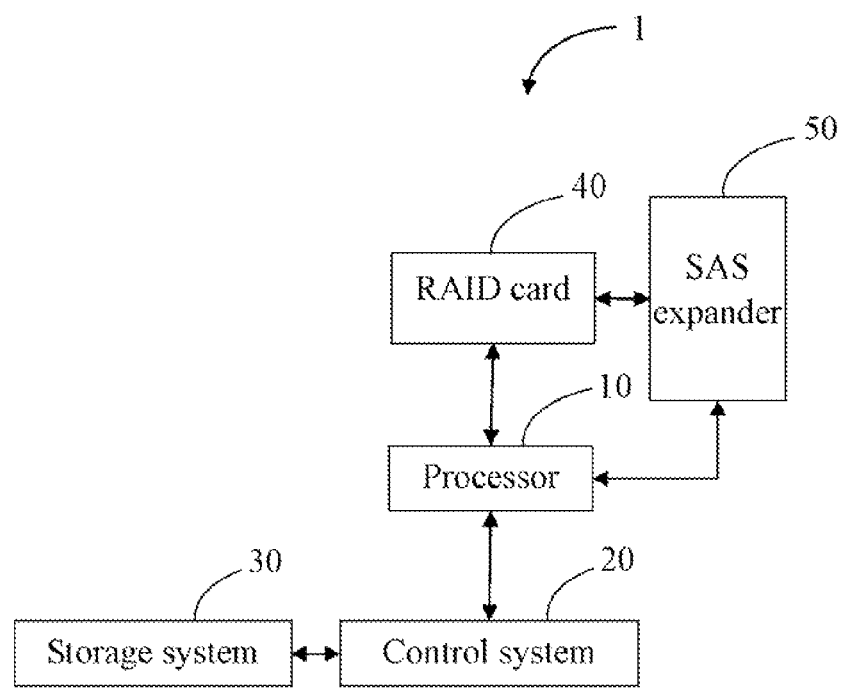
FIG. 1 is a block diagram of one embodiment of an electronic device including a control system.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one."

In general, the word "module" as used herein refers to logic embodied in hardware or firmware, or to a collection of software instructions, written in a programming language, such as, Java, C, or assembly. One or more software instructions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable media include compact discs (CDs), digital versatile discs (DVDs), Blu-ray disks, flash memory, and hard disk drives.

FIG. 1 is a block diagram of one embodiment of an electronic device 1. The electronic device 1 includes a control system 20. The electronic device 1 further includes at least one processor 10, a storage system 30, a RAID card 40, and a SAS expander 50. The at least one processor 10 executes one or more computerized codes and other applications of the electronic device 1, to provide functions of the control system 20. The storage system 30 stores data of the electronic device 1. The control system 20 may adjust correlative parameters of the SAS expander 50 according information of the RAID card 40 automatically, and make the SAS expander 50 connect to different RAID cards conveniently.

The at least one processor 10 is electronically connected to both of the RAID card 40 and the SAS expander 50. The RAID card 40 may be electronically connected to the SAS expander 50 through a SAS port (not shown in FIG. 1). The SAS expander 50 may be electronically connected to one or more peripheral devices (not shown in FIG. 1), such as, a hard disk drive (HDD), for example.

Different RAID cards may support different RAID levels. The RAID levels may include RAID 0, RAID 1, RAID 3, RAID 4, RAID 5, RAID 6, RAID 10, RAID 50, RAID 60, for example. The SAS expander 50 includes a flash memory (not shown in FIG. 1) to store a firmware of the SAS expander 50. The firmware is embedded in the SAS expander 50 and makes functions of the SAS expander 50 work normally, and the firmware can be updated or upgraded. The firmware may accommodate, but are not limited to, configuration parameters of the SAS expander 50, such as, configuration data of a physical layer (PHY) of the SAS expander 50, address data of the SAS expander 50, connection data of the PHY of the SAS expander 50, for example. In one embodiment, when the SAS expander 50 is electronically connected to a RAID card correctly, the firmware further accommodate information of the connected RAID card, such as, the RAID levels that the connected RAID card supports, for example.

In one embodiment, a firmware file is stored in the storage system 30. The firmware file includes fixed pages (storage units of information) that store information of a RAID card, and configuration parameters of the SAS expander 50 corresponding to the RAID card. The firmware of the SAS expander 50 may be updated by storing the firmware file into the flash memory of the SAS expander 50.

Figure 2:
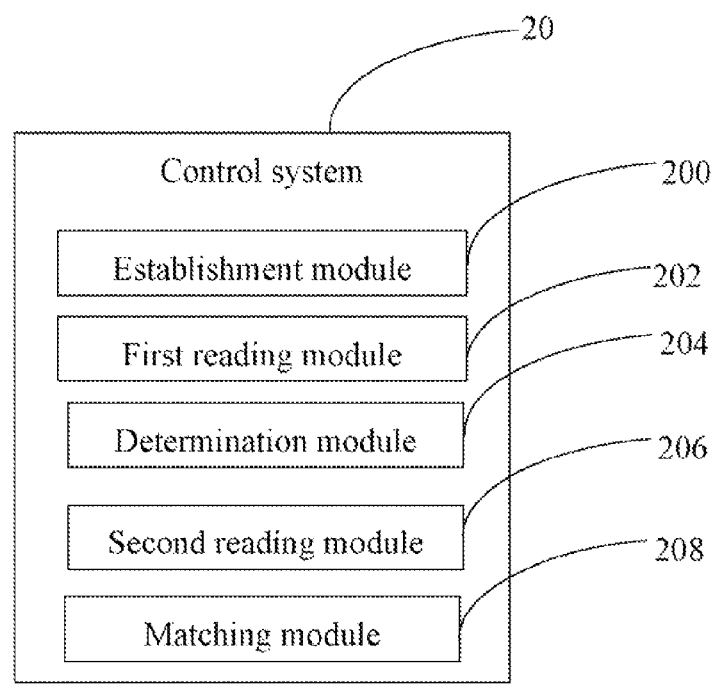
FIG. 2 is a block diagram of function modules of a control system included in the electronic device of FIG. 1.

FIG. 2 is a block diagram of function modules of the control system 20 included in the electronic device of FIG. 1. In the embodiment, the control system 20 may include an establishment module 200, a first reading module 202, a determination module 204, a second reading module 206, and a matching module 208. The modules 200, 202, 204, 206, and 208 comprise computerized codes in the window of one or more programs that are stored in the storage system 30. The computerized codes include instructions that are executed by the at least one processor 10 to provide functions for the modules 200, 202, 204, 206, and 208. Details of each of the modules will be given in FIG. 3.

Figure 3:
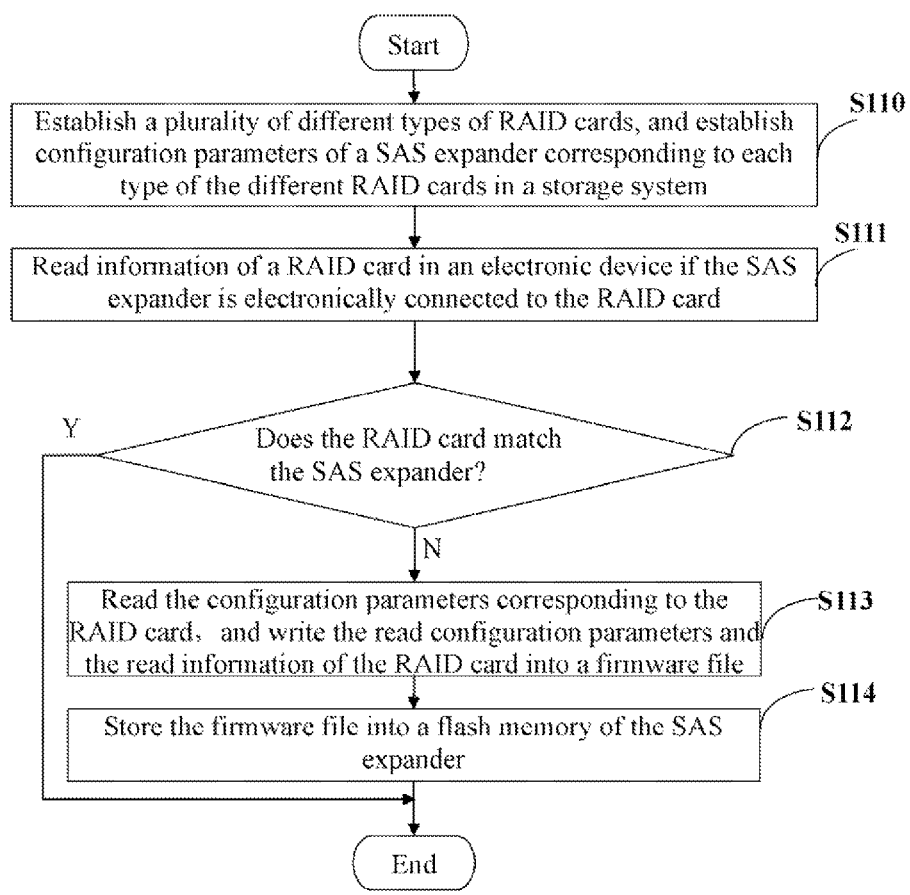
FIG. 3 is a flowchart of one embodiment of a method for controlling a SAS expander to electronically connect to a RAID card in the electronic device of FIG. 1.

FIG. 3 is a flowchart of one embodiment of method for controlling the SAS expander 50 to electronically connect to the RAID card 40 using the electronic device of FIG. 1. Depending on the embodiment, additional steps may be added, others deleted, and the ordering of the steps may be changed.

In step S110, the establishment module 200 establishes a plurality of different types of RAID cards according to the RAID levels that the RAID cards support in the storage system 30, and establishes the configuration parameters of the SAS expander 50 corresponding to each type of RAID cards into the storage system 30. In one embodiment, the types of RAID cards may include, but is not limited to an IRRAID type that only supports the RAID 0 and the RAID 1, an IT RAID type that supports other RAID levels except the RAID 0 and the RAID 1, and a MEGA RAID type that supports RAID 0, RAID 1, RAID 5, RAID 6, RAID50, and RAID 60, for example. The types RAID cards can be established according to user preference or actual requirements.

If the SAS expander 50 is electronically connected to the RAID card 40, in step S111, the first reading module 202 reads information of the RAID card 40 including the RAID levels that the RAID card 40 support.

In step S112, the determination module 204 determines whether the RAID card 40 matches the SAS expander 50. In some embodiments, if the read RAID levels in the read information of the RAID card 40 are the same as the RAID levels stored in the firmware of the SAS expander 50, the determination module 204 determines that the RAID card 40 matches the SAS expander 50, and the procedure ends. If the read RAID levels in the read information of the RAID card 40 are different from the RAID levels stored in the firmware of the SAS expander 50, the determination module 204 determines that the RAID card 40 does not match the SAS expander 50, and step S113 is implemented.

In other embodiments, if the SAS expander 50 is not connected to any RAID card correctly before connecting to the RAID card 40, there is no information about the RAID level stored in the SAS expander 50. The determination module 204 also determines that the RAID card 40 does not match the SAS expander 50, and step S113 is implemented.

In step S113, the second reading module 206 reads the configuration parameters corresponding to the RAID card 40, and writes the read configuration parameters and the read information of the RAID card 40 into the firmware file in the storage system 30. The second reading module 206 reads the configuration parameters according to the type of the read RAID levels in the read information of the RAID card 40.

In step S114, the matching module 208 stores the firmware file into the flash memory of the SAS expander 50, for updating the firmware of the SAS expander 50. Then, the RAID card 40 matches the SAS expander 50, and is electronically connected to the SAS expander 50 correctly. In one embodiment, if the firmware is updated, the SAS expander 50 needs to restart to be used normally.

All of the processes described above may be embodied in, and fully automated via, functional code modules executed by one or more general purpose processors such as the processor 30. The code modules may be stored in any type of non-transitory readable medium or other storage device such as the storage system 30. Some or all of the methods may alternatively be embodied in specialized hardware. Depending on the embodiment, the non-transitory readable medium may be a hard disk drive, a compact disc, a digital versatile disc, a tape drive, or other suitable storage medium.

The described embodiments are merely examples of implementations, and have been set forth for a clear understanding of the principles of the present disclosure. Variations and modifications may be made without departing substantially from the spirit and principles of the present disclosure. All such modifications and variations are intended to be included within the scope of this disclosure and the described inventive embodiments, and the present disclosure is protected by the following claims and their equivalents.

What is claimed is:

1. A computer-implemented method for controlling a serial attached small computer system interface (SAS) expander to electronically connect to a redundant array of independent disks (RAID) card in an electronic device, the method comprising:

establishing a plurality of different types of RAID cards according to RAID levels that the RAID cards support, and establishing configuration parameters of the SAS expander corresponding to each type of the RAID cards in a storage system of the electronic device;

reading information of the RAID card in the electronic device if the SAS expander is electronically connected to the RAID card, the read information comprising RAID levels that the RAID card supports;

determining whether the RAID card matches the SAS expander by comparing whether the RAID levels in the read information of the RAID card are the same as RAID levels stored in a firmware of the SAS expander, the stored RAID levels being supported by a previous RAID card in the electronic device which is connected to the SAS expander correctly;

reading the configuration parameters of the SAS expander corresponding to the RAID card, and writing the read configuration parameters and the read information of the RAID card into a firmware file in the storage system, if the RAID card does not match the SAS expander; and storing the firmware file into a flash memory of the SAS expander.

2. The method according to claim 1, wherein the firmware file comprises fixed pages that store the read information of the RAID card and the read configuration parameters of the SAS expander corresponding to the RAID card.

3. The method according to claim 1, further comprising:

determining that the RAID card match the SAS expander when the RAID levels in the read information of the RAID card are the same as the stored RAID levels in the firmware of the SAS expander; or determining that the RAID card does not match the SAS expander when the RAID levels in the read information of the RAID card are different from the stored RAID levels in the firmware of the SAS expander.

4. The method according to claim 1, further comprising:

determining that the RAID card does not match the SAS expander, if there is no previous RAID card being electronically connected to the SAS expander correctly and no information of the RAID level is stored in the firmware of SAS expander.

5. The method according to claim 1, wherein the firmware of the SAS expander is updated when the firmware file is stored into the flash memory of the SAS expander.

6. A non-transitory storage medium storing a set of instructions, when executed by at least one processor of an electronic device, cause the at least one processor to perform a method for controlling a serial attached small computer system interface (SAS) expander to electronically connect to a redundant array of independent disks (RAID) card, the method comprising:

establishing a plurality of different types of RAID cards according to RAID levels that the RAID cards support, and establishing configuration parameters of the SAS expander corresponding to each type of the RAID cards in a storage system of the electronic device;

reading information of the RAID card in the electronic device if the SAS expander is electronically connected to the RAID card, the read information comprising RAID levels that the RAID card supports;

determining whether the RAID card matches the SAS expander by comparing whether the RAID levels in the read information of the RAID card are the same as RAID levels stored in a firmware of the SAS expander, the stored RAID levels being supported by a previous RAID card in the electronic device which is connected to the SAS expander correctly;

reading the configuration parameters of the SAS expander corresponding to the RAID card, and writing the read configuration parameters and the read information of the RAID card into a firmware file in the storage system, if the RAID card does not match the SAS expander; and storing the firmware file into a flash memory of the SAS expander.

7. The non-transitory storage medium according to claim 6, wherein the firmware file comprises fixed pages that store the read information of the RAID card and the configuration parameters of the SAS expander corresponding to the RAID card.

8. The non-transitory storage medium according to claim 6, wherein the method further comprises:
  determining that the RAID card match the SAS expander when the RAID levels in the read information of the RAID card are the same as the stored RAID levels in the firmware of the SAS expander; or
  determining that the RAID card does not match the SAS expander when the RAID levels in the read information of the RAID card are different from the stored RAID levels in the firmware of the SAS expander.

9. The non-transitory storage medium according to claim 6, wherein the method further comprises:
  determining that the RAID card does not match the SAS expander, if there is no previous RAID card being electronically connected to the SAS expander correctly and no information of the RAID level is stored in the firmware of SAS expander.

10. The non-transitory storage medium according to claim 6, wherein the firmware of the SAS expander is updated when the firmware file is stored into the flash memory of the SAS expander.

11. An electronic device, comprising:
  a serial attached small computer system interface (SAS) expander, a redundant array of independent disks (RAID) card;
  a storage system;
  at least one processor; and
  one or more programs that are stored in the storage system and executed by the at least one processor, the one or more programs comprising:
    an establishment module that establishes a plurality of different types of RAID cards according to RAID levels that the RAID cards support, and establishes configuration parameters of the SAS expander corresponding to each type of the RAID cards in the storage system;
    a first reading module that reads information of the RAID card if the SAS expander is electronically connected to the RAID card, the read information comprising RAID levels that the RAID card supports;
    a determination module that determines whether the RAID card matches the SAS expander by comparing whether the RAID levels in the read information of the RAID card are the same as RAID levels stored in a firmware of the SAS expander, the stored RAID levels being supported by a previous RAID card in the electronic device which is connected to the SAS expander correctly;
    a second reading module that reads the configuration parameters of the SAS expander corresponding to the RAID card, and writes the read configuration parameters and the read information of the RAID card into a firmware file in the storage system, if the RAID card does not match the SAS expander;
    a matching module that stores the firmware file into a flash memory of the SAS expander.

12. The electronic device according to claim 11, wherein the firmware file comprises fixed pages that store the read information of the RAID card and the configuration parameters of the SAS expander corresponding to the RAID card.

13. The electronic device according to claim 11, wherein the determination module determines that the RAID card matches the SAS expander when the RAID levels in the read information of the RAID card are the same as the stored RAID levels in the firmware of the SAS expander, and determines that the RAID card does not match the SAS expander when the RAID levels in the read information of the RAID card are different from the stored RAID levels in the firmware of the SAS expander.

14. The electronic device according to claim 11, wherein the determination module further determines that the RAID card does not match the SAS expander, if there is no previous RAID card being electronically connected to the SAS expander correctly and no information of the RAID level is stored in the firmware of SAS expander.

15. The electronic device according to claim 11, wherein the firmware of the SAS expander is updated when the firmware file is stored into the flash memory of the SAS expander.

* * * * *